United States Patent
Lee et al.

(10) Patent No.: US 6,329,902 B1
(45) Date of Patent: Dec. 11, 2001

(54) WIDE AREA TWO-WAY PAGING USING A MESH NETWORK WITH PAGING RECEIVERS

(75) Inventors: William Chein-Yeh Lee, Danville; Michael L. Olson, Fremont, both of CA (US)

(73) Assignee: Cellco Partnership, Bedminster, NJ (US)

( * ) Notice: Subject to any disclaimer, the term of this patent is extended or adjusted under 35 U.S.C. 154(b) by 1263 days.

(21) Appl. No.: 08/571,679

(22) Filed: Dec. 13, 1995

Related U.S. Application Data

(63) Continuation of application No. 08/230,488, filed on Apr. 20, 1994, now abandoned.

(51) Int. Cl.[7] .................................................. H04Q 1/00
(52) U.S. Cl. .................................. 340/7.27; 340/825.49; 370/335
(58) Field of Search ................... 340/825.44, 825.47, 340/825.06, 825.49, 825.5, 7.27; 379/57; 455/38.1; 375/200; 370/335

(56) References Cited

U.S. PATENT DOCUMENTS

| | | |
|---|---|---|
| 3,575,558 | 4/1971 | Leyburn et al. . |
| 4,336,524 | 6/1982 | Levin . |
| 4,747,122 | 5/1988 | Bhagat et al. . |
| 4,814,763 | 3/1989 | Nelson et al. . |
| 4,939,726 | 7/1990 | Flammer et al. . |
| 5,051,741 * | 9/1991 | Wesby .............................. 340/825.44 |
| 5,079,768 | 1/1992 | Flammer . |
| 5,115,433 | 5/1992 | Baran et al. . |
| 5,130,987 | 7/1992 | Flammer . |
| 5,166,929 * | 11/1992 | Lo ........................................ 455/38.1 |
| 5,181,200 * | 1/1993 | Harrison .......................... 340/825.44 |

OTHER PUBLICATIONS

Data Communications, Networks, and Systems. Thomas Bartee 1992 pg 215–218.*
"Mobile Cellular Telecommunications Systems" William C Lee 1989 pp 70–71.*

* cited by examiner

Primary Examiner—Brain Zimmerman
(74) Attorney, Agent, or Firm—Gates & Cooper LLP

(57) ABSTRACT

A wide area paging broadcast channel for transmitting a page signal throughout a prescribed geographic area over a broadcast channel in response to a page request. At least one subscriber transceiver is located within the prescribe geographic area for receiving the page. In response to the received page signal, the subscriber transceiver transmits information back to the paging control center. However, the backhaul to the paging control center is accomplished by a plurality of base stations. Each base station forms a node in a mesh network of base stations which covers the prescribed geographic area. The subscriber transceiver may transmit information packets to nodes within the mesh network using a multiple access scheme with or without carrier sense access. The mesh network automatically selects which neighboring node to use for forwarding packets. Finally, a gateway device links the mesh network of base stations to the control center. The gateway device then forwards the transmitted information from the subscriber transceiver to the paging control center over the telephone network.

9 Claims, 4 Drawing Sheets

WIDE AREA TWO-WAY PAGING USING A MESH NETWORK WITH PAGING RECEIVERS

This is a Continuation of application Ser. No. 08/230,488, filed Apr. 20, 1994, now abandoned.

BACKGROUND OF THE INVENTION

1. Field of the Invention

This invention relates in general to a paging system and, more particularly, to a wide area two-way paging broadcast channel with a mesh network that includes acknowledgement paging receivers integrated with each node to enable self-backhaul of the reply signal to the paging center through a paging network gateway.

2. Description of Related Art

Radio paging systems are well know and widely used. Paging systems provide the user with information from a paging party. Such information typically consists of a number for the paged party to call in response to the page. Some pagers display other information such as the time and date of the message.

One such system, U.S. Pat. No. 3,575,558, issued Apr. 20, 1971, to Leyburn, entitled "TELEPHONE PAGING SYSTEM AND METHOD", incorporated herein by reference, discloses a telephone system and radio paging system wherein a sensible signal for informing the subscriber to phone a prearranged location is activated when a paging number is dialed. The paging system is designed so that once the receiver is energized, the sensible alarm will remain activated until turned off by the possessor of the receiver. Thus, the acknowledgement paging signal is only sent once.

Other paging systems have been used which transmit limited content messages in coded form to a central station. The central station then determines the page code for the identified subscriber and transmits a signal to activate the selected subscriber's portable page receiver. U.S. Pat. No. 4,336,524, issued Jun. 22, 1982, to Levine, entitled "VIDEO DISPLAY PAGER RECEIVER WITH MEMORY", incorporated herein by reference, discloses such a system.

Still other pagers allow two-way communication between the recipient party and the paging party. U.S. Pat. No. 4,814,763, issued Mar. 21, 1989, to Nelson et al., entitled "PAGING TERMINAL APPARATUS WITH PAGE FORWARDING CAPABILITY AND METHODOLOGY THEREOF", incorporated herein by reference, discloses a paging system for automatically, or by selective response, call forwarding a message to one or more system pagers which have an acknowledge back capability.

These existing paging networks for regional wireless networking either involve public (common carrier) or private carrier networks that use licensed spectrum allocated by the Federal Communications Commission (FCC) for their exclusive use. The expense for deployment is large for acknowledgement paging networks and the cost to the end user is high ($75–100/month typically). In addition, the above type of paging networks are usually configured in a star arrangement with the transmitter at the geographic center of the network.

Additionally, the difficult task is that the above star-type networks require that the signals be routed to a central hub. To overcome these problems, intelligent wireless mesh networks have been developed for the transfer of data between a user and a remote location. Such networks provide lower network costs.

An example of a low-cost network is U.S. Pat. No. 4,939,726, issued Jul. 3, 1990, to Flammer et al., assigned to Metricom, Inc., entitled "METHOD FOR ROUTING PACKETS IN A PACKET COMMUNICATION NETWORK", incorporated herein by reference, which discloses a packet network routing method and system based on geographic coordinate identifiers. Each node in a mesh network is uniquely identified by absolute geographical coordinates or by a code indicating absolute location in an external coordinate-based reference system. The coordinates are then used as part of a packet identifier for each packet generated for use in making routing decisions.

U.S. Pat. No. 5,115,433, issued May 19, 1992, to Baran et al., assigned to Metricom, Inc., entitled "METHOD AND SYSTEM FOR ROUTING PACKETS IN A PACKET COMMUNICATION NETWORK", incorporated herein by reference, discloses a method and system for selecting which neighboring nodes to use for forwarding packets. The system bases the determination on which available node requires the least amount of power for forwarding the packet.

U.S. Pat. No. 5,079,768, issued Jan. 7, 1992, to Flammer, assigned to Metricom, Inc., entitled "METHOD FOR FREQUENCY SHARING IN FREQUENCY HOPPING COMMUNICATIONS NETWORK", incorporated herein by reference, discloses a system which can utilize the 902–928 MHz frequency band which is restricted by the FCC to a continuous transmission by a single transmitter of no more than 1 watt output power on any one channel and of no more than 400 milliseconds duration each 30 seconds. Thus, all other channels must be selected prior to retransmission on the same frequency. (See FCC Rules, Part 15.247, incorporated herein).

To meet these FCC requirements, a frequency-hopping plan may be implemented. Each receiving node establishes, in each station or node, a table of receiver frequency hopping sequence offsets of each other node within its communication range. Each node transmits an information packet that includes a hop timing offset indicator which allows the nodes to set themselves in synchronization with one another. The node checks the frequency channel to determine whether the channel is available for transmission. If the channel is not available, the node continues to monitor the selected node until an available frequency channel is found.

U.S. Pat. No. 5,130,987, issued Jul. 14, 1992, to Flammer, assigned to Metricom, Inc., entitled "METHOD FOR SYNCHRONIZING A WIDE AREA NETWORK WITHOUT GLOBAL SYNCHRONIZING", incorporated herein by reference, discloses a method for maintaining frequency and time synchronization within a mesh network. Each node collects a representation of age value for other nodes and changes slot according to a known pattern and independently of each node within the network. The slot is a frequency channel during a preselected time period. The packets are transmitted from the source node to an addressed node at a frequency and for a duration synchronous with the slot of the addressed node. Accordingly, the source node tracks the changing frequency of the receiving node.

The above mesh network concept is one ingredient of the present invention. The mesh network allows for much smaller transceiver base stations (0.5 ft$^3$ vs. 2,000 ft$^3$) at a lower price ($1,000.00) compared with the much higher (by orders of magnitude) typical cost of a cellular base station. Each base station is capable of providing coverage for approximately one square mile thereby substantially reducing the transmit power required in an acknowledgement pager (as low as 10 mw), enhancing battery life, and mitigating RF safety concerns. This compares to one station per 15 to 75 square miles for cellular (which requires a 0.6 w to 3.0 w cellular phone). Thus, the overall network cost of a wide area acknowledgement paging, which is well suited for use in an urban environment, is lower. In addition, wide area acknowledgement paging facilitates the use of low power user radios (acknowledgement pager) since the mesh network enables short range communications. Accordingly the mesh network transports the user traffic from the base station to a Public Switched Telephone Network (PSTN) or other network access point (e.g., a communications gateway). The combination of low cost base stations, short distance between the end user and the mesh transceiver node, and backhaul transport by the wireless mesh network rather than accessing the PSTN or other network access node (gateway) by line-of-sight microwave or leased lines, solves the battery life, safety, infrastructure cost and coverage problems discussed above.

Although the wireless mesh network approach is an improvement over prior methods of communicating information over a wireless network, it carries its own drawback. For instance, even though wireless mesh networks are the right answer for low-cost geographic coverage and self-backhaul to a network gateway, they still present a further barrier to subscriber equipment. That is, the cost of said equipment remains prohibitively high.

For example, the cost of subscriber equipment is still comparable to the base station cost since the base station is a peer to the subscriber unit. The estimated cost of $500 for the subscriber unit is still too high for most potential users. However, consumers expect low-cost connectivity. Paging is a good example of such a service. For $9 to $45/month, broadcast paging is available at a price consumers can afford with a device that costs them $80 to $180.

In addition, the network equipment described in U.S. Pat. No. 5,079,768 requires a radio that uses a frequency synthesizer for spread spectrum, and transmits roughly 3 watts of power (marginally acceptable from a user's safety standpoint). A radio with this much transmit power, lacking the wake-sleep efficiency of a paging receiver, and the complexity of a frequency synthesizer, will not work long on a set of batteries and will be prohibitively inconvenient and expensive.

Thus, there is a need for wide area two-way paging using a mesh network with paging receivers installed and integrated with mesh node base stations.

SUMMARY OF THE INVENTION

To overcome the limitations in the prior art described above, and to overcome other limitations that will become apparent upon reading and understanding the present specification, the present invention discloses a wide area paging system for providing page broadcasts to subscriber transceivers in response to page requests and providing acknowledgement back capability separately from the page broadcast channel. The present invention solves the above-described problems by providing a combined wide area paging broadcast channel with a mesh network having paging receivers installed and integrated with the mesh node base stations. The present invention includes a wide area paging broadcast channel for transmitting a page signal throughout a prescribed geographic area and a paging control center, connected to a telephone network, for initiating a page broadcast over the broadcast channel in response to a page request. At least one subscriber transceiver is located within the prescribed geographic area for receiving the page. In response to the received page signal, the subscriber transceiver transmits information back to the paging control center through a paging network gateway.

Importantly, however, the backhaul through the paging network gateway to the paging control center is accomplished by a plurality of base stations. Each base station forms a node in a mesh network of base stations which covers the prescribed geographic area. The mesh network automatically selects which neighboring node to use for forwarding information packets. The system bases this determination on which node is available for forwarding the information packet.

Finally, a gateway device links the mesh network of base stations to the control center. The gateway device forwards the transmitted information from the subscriber transceiver to the paging control center over the telephone network.

One aspect of the present invention is that the broadcast paging channel reduces/eliminates broadcast paging traffic overhead in the mesh network. Thus, all page alert traffic to the user device is through the wide area paging network.

Another aspect of the present invention is that the user device transmits at low power to the mesh nodes.

Another aspect of the present invention is that the forward paging channel may be utilized to manage network acknowledgements and/or control of the subscriber units.

Yet another aspect of the present invention is that the subscriber transceiver transmits information packets to nodes within a mesh network using a multiple access scheme with or without carrier sense access.

Another aspect of the present invention is that the mesh network provides backhaul to the gateway and telephone network.

Another aspect of the present invention is that the mesh network could also be accessed by "peer" portable nodes who wish to operate at higher power and faster data rates than the low data rate subscriber transceivers.

Another aspect of the present invention is that the paging channel may also direct "peer" portables that a call is pending to minimize network traffic when a portable unit's location is unknown within the network.

Another aspect of the present invention is that low duty-cycle data applications other than acknowledgement paging are accommodated. These include alarm/security monitoring, credit card authorization, telemetry environmental monitoring, supervision control and data acquisition, messaging. The intelligent mesh network can find the route of each call back to the paging center. Any initial calls from the subscribers, such as alarm or credit card authorization, memorize the routes to each node for returning responses from the center to the subscribers.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the invention.

Figure 1A:
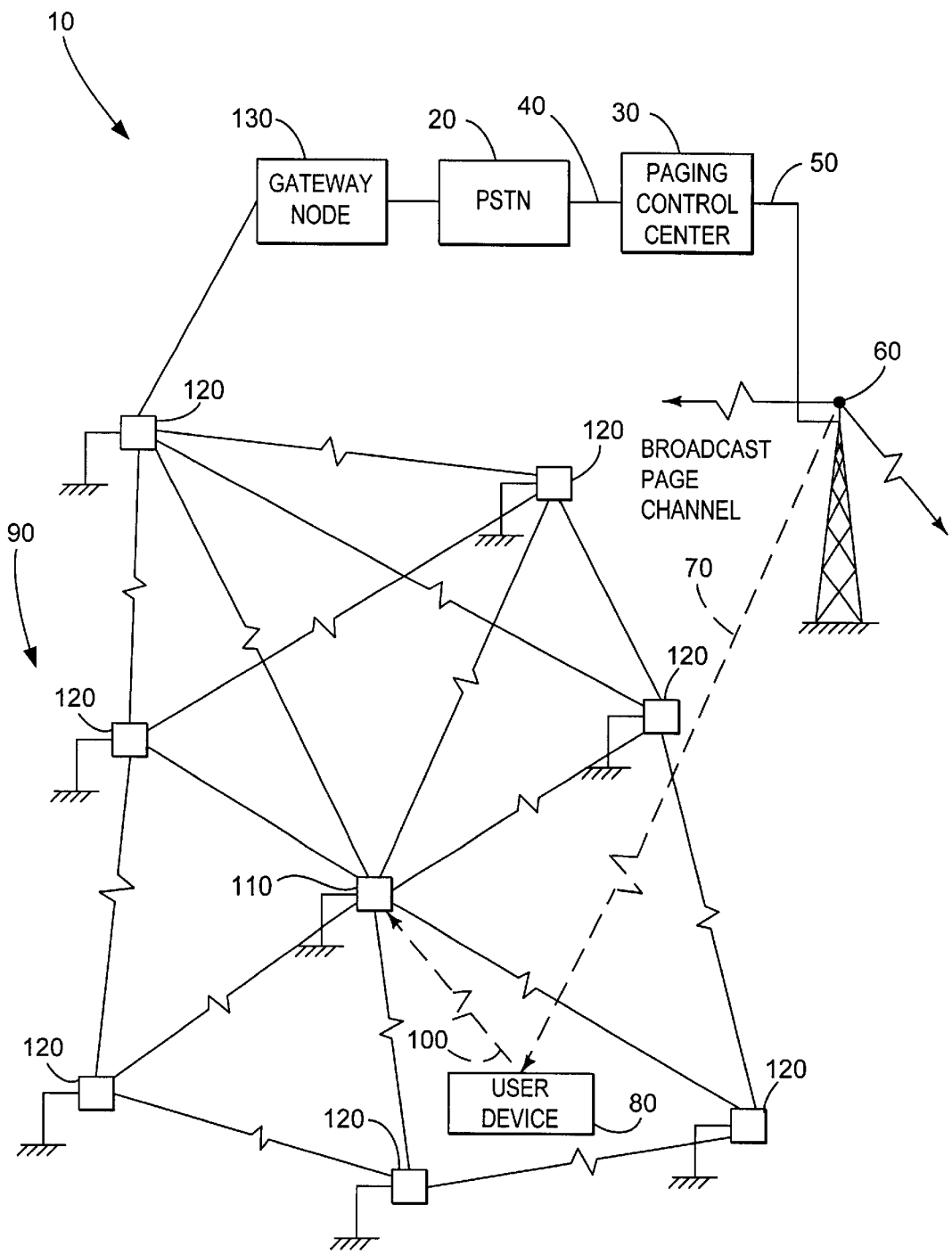
FIGS. 1(a) and 1(b) are block diagrams of the present invention.

The present invention provides a wide area two-way paging broadcast channel and a network of paging receivers installed and integrated with node base stations. The nodes are distributed over a predefined area to form a mesh network. FIG. 1(a) illustrates an exemplary system 10 according to the present invention. A page request is initiated and sent over a telephone network 20, such as a PSTN, to a paging controller 30 over line 40. The paging controller 30 coordinates all page activity. The paging controller 30 transmits the paged message over line 50 to a transmitter 60. The paged message is sent out over the wide area paging broadcast channel 70. The wide area paging broadcast channel 70 provides one way signaling to targeted subscriber receivers. The output power of the transmitter is sufficient for broadcasting the page signal over a wide geographic area which may be served by several mesh networks. Any unused frame in the forward paging channel may be utilized to manage network acknowledgements and/or control of the subscriber units. For example, but not to be construed limit the invention in any manner, the unused frame may be used to manage DC power consumption and RF power output.

The user device or subscriber transceiver 80 within the geographical area of the mesh network 90 receives the page signal broadcast over the wide area paging broadcast channel 70. The subscriber transceiver 80 then transmits an information packet, such as an acknowledgement signal 100, to a node 110 within the mesh 90 using a multiple access scheme with or without carrier sense access. For example, the multiple access scheme may be, but is not limited to, an aloha access scheme. The data rate of the subscriber transceiver is preferably 4.8 kilobytes per second. However, it is to be understood, that other data rates could be utilized without departing from the present invention. The node 110 receiving the acknowledgement signal 100 then determines the next nearest node 120 which can receive the signal 100. For example, this determination may be based upon, but is not limited to, power requirements, node availability, delays and channel reliability. The node transceivers 110, 120 operate over any frequency range at preferably data rates of 64 kbps. Again, it is to be understood that other data rates could be utilized without departing from the present invention. Also note that the described frequency range is merely exemplary and others would be equally adequate. The mesh network 90 repeats this scheme to backhaul the acknowledgement 100 across nodes 120 within the meshed network 90 until arriving at the gateway node 130. The gateway node provides a transition from the mesh network to telephone network 20. At that point the acknowledgement 100 is transmitted to the paging control center 30 over telephone network 20.

Figure 1B:
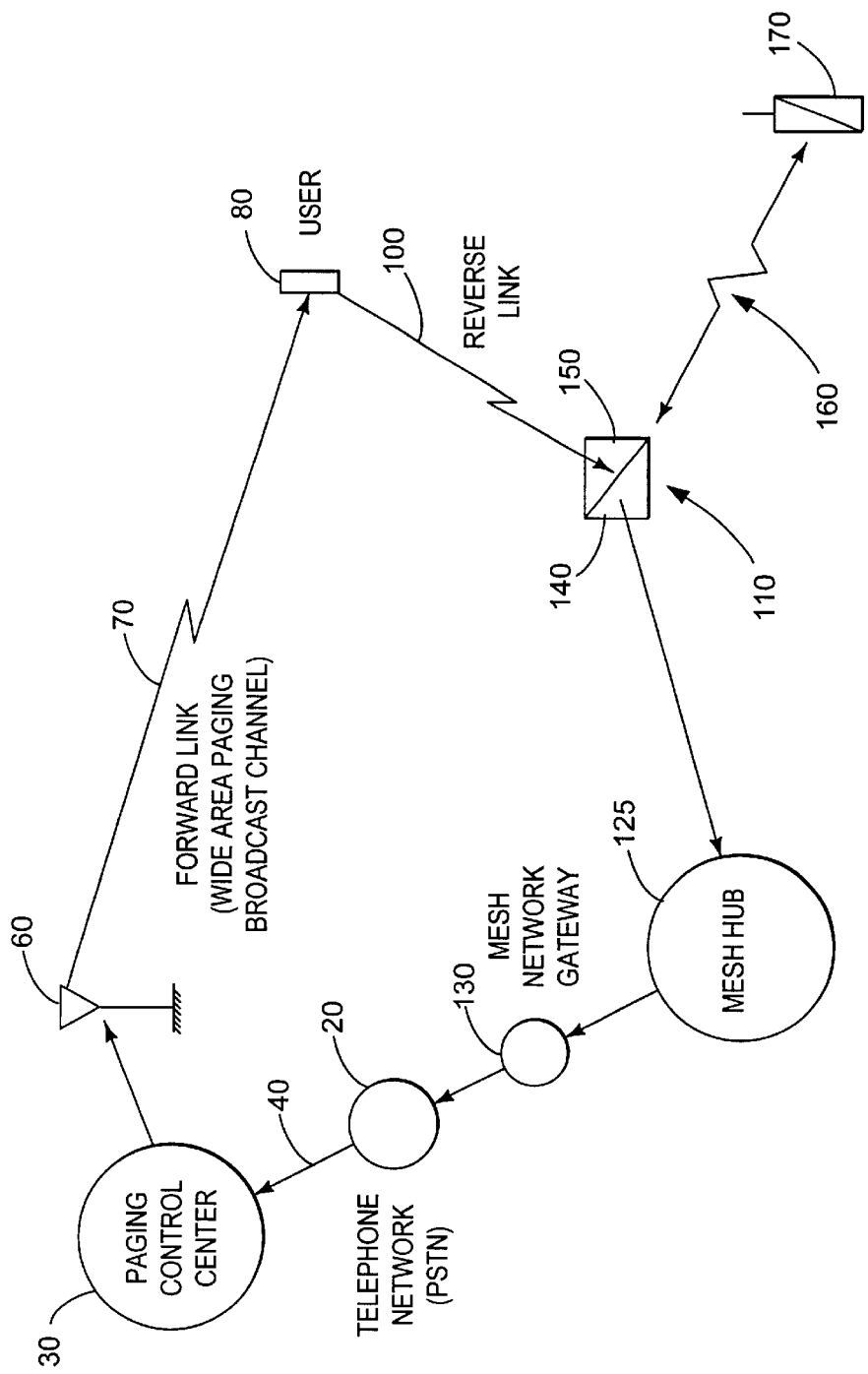

FIG. 1(b) also illustrates the block diagram of the present invention, but in a simplified manner. For purposes of clarifying the signal paths, the complete mesh network is not shown, but rather only one node 110. As described above with reference to FIG. 1(a), a page request is initiated and sent over a telephone network 20 to a paging controller 30 over line 40. The paging controller 30 transmits the paged message over line 50 to a transmitter 60. The paged message is sent out over the wide area broadcast page channel 70. The paging signal is received by the user device or subscriber transceiver 80 within the geographical area of the mesh network 90. The subscriber transceiver 80 then transmits an information packet, such as an acknowledgement signal 100, to a node 110 within the mesh 90.

The mesh network could also be accessed by peer portable nodes which operate at higher power and faster data rates than the lower data rate subscriber transceivers. FIG. 1(b) illustrates a portable or mobile node 170 communicating with node 110 by way of signal path 160. The paging channel would also alert peer portables that a call was pending to minimize network traffic when a portable node unit's location is unknown within the network.

Node 110, after receiving the acknowledgement signal 100, routes an acknowledgement signal to a node mesh hub 125. Node mesh hub 125 coordinates acknowledgement signals received from neighboring nodes 110 or other peer portable nodes 170. Mesh hub 125 routes all received acknowledgement signals to the mesh network gateway 130. At this point the acknowledgement 100 is transmitted to the paging control center 30 over the telephone network 20.

Figure 2:
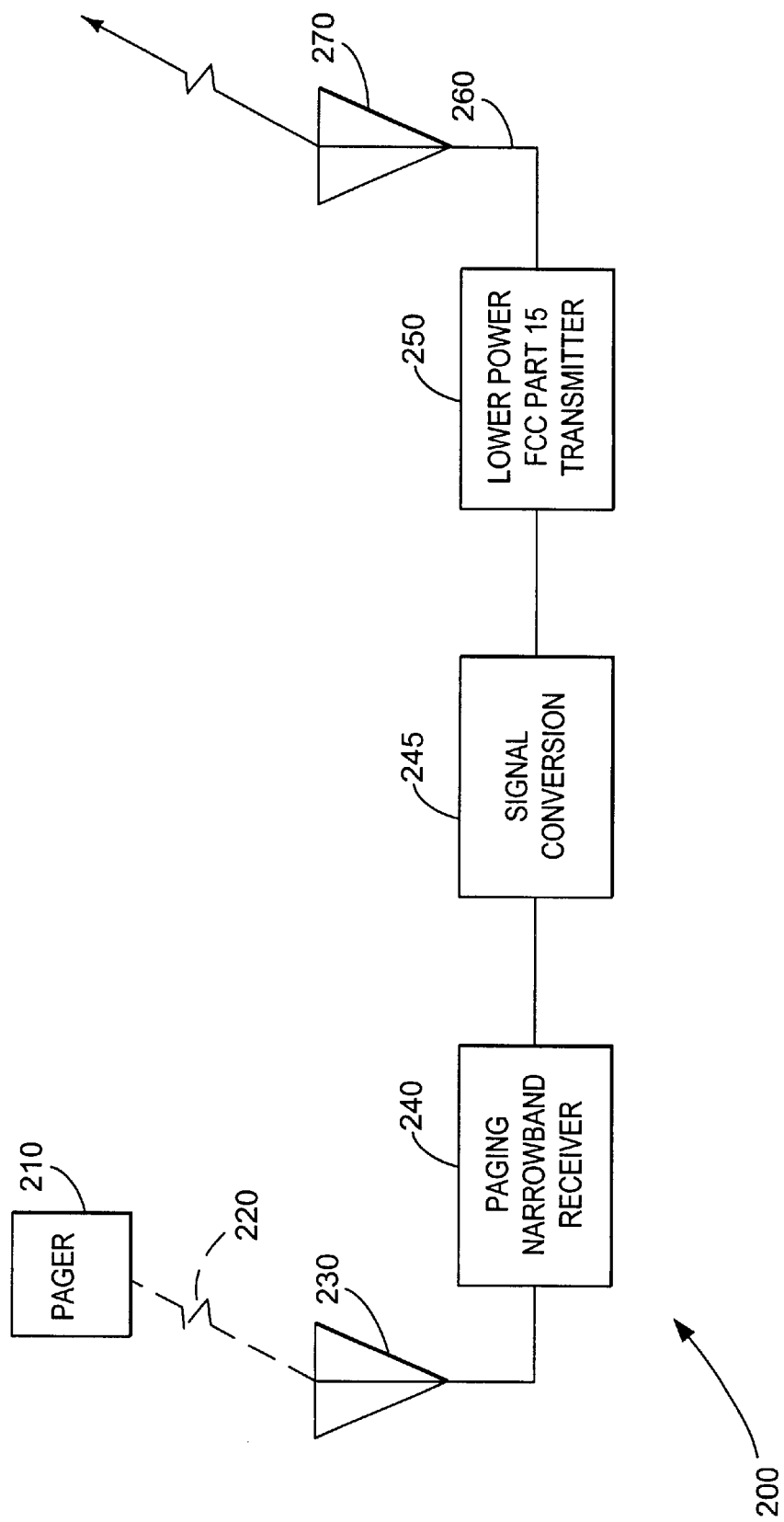
FIG. 2 is a block diagram of an acknowledgement paging and/or data receiver installed and integrated with a mesh node base station in accordance with the invention.

FIG. 2 illustrates an exemplary node 200 of the present invention. A paging receiver 240 is installed and integrated with a mesh node base station transceiver 250. A pager or subscriber transceiver 210 transmits an acknowledgement signal 220 which is received by the antenna 230. The antenna 230 directs the signal to the paging narrowband receiver 240. The output of the narrowband receiver 240 is acted upon by signal conversion device 245. Signal conversion device 245 transforms the acknowledgement signal 220 received from the user into a signal that is properly formatted for transmission by the node low power transceiver 250. Transceiver 250 transmits the signal over antenna 270 to the next appropriate node within the mesh network using the scheme discussed above with reference to FIGS. 1(a) and 1(b).

Figure 3:
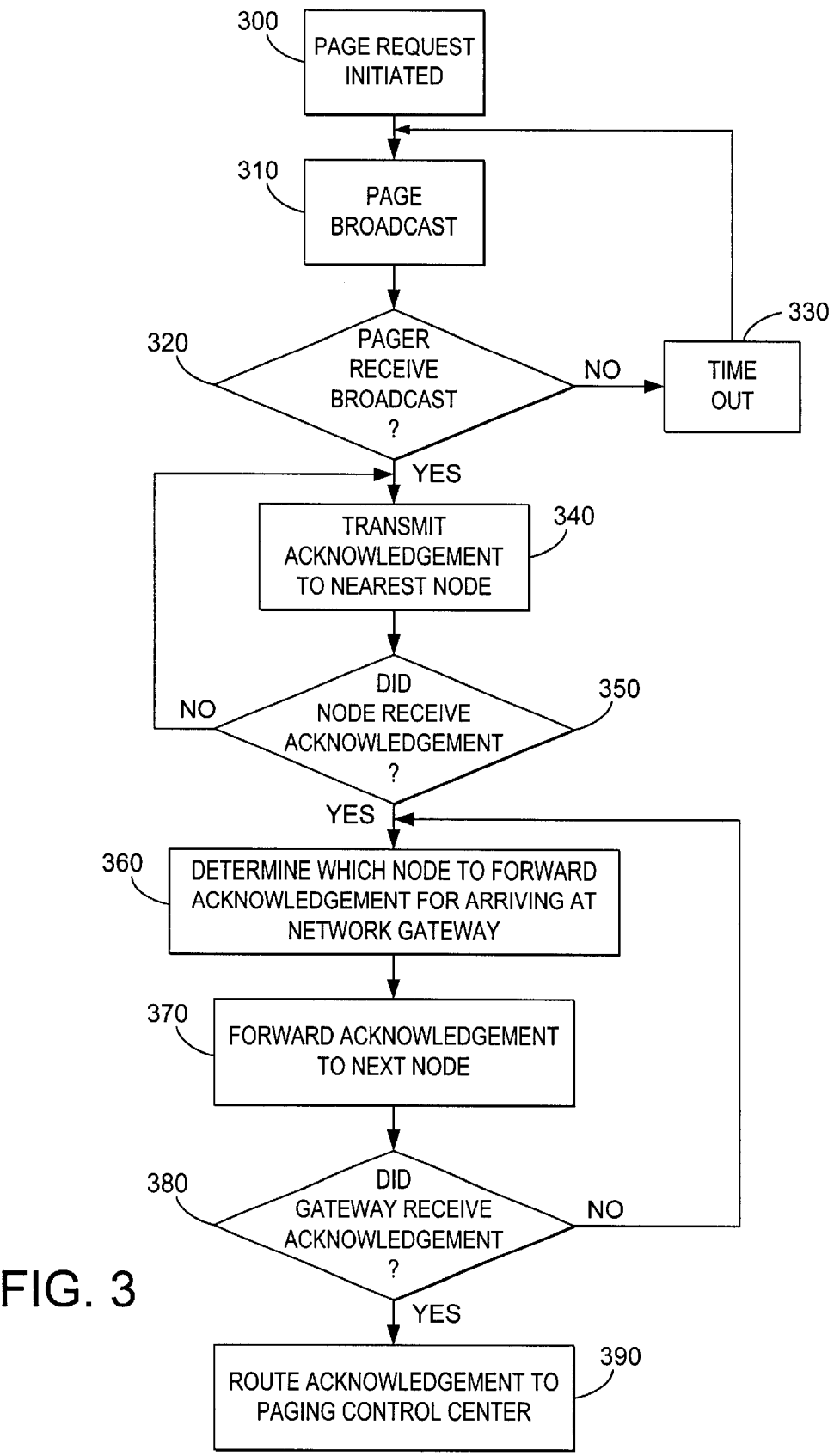
FIG. 3 is a flow chart describing the operation of the wide area paging system using a mesh network with paging receivers in accordance with the invention.

FIG. 3 is a flow chart which indicates how a page request is transmitted over a wide area paging broadcast channel to a mesh network. In the flow chart, block 300 describes the initiation of the page request. Block 310 describes the page broadcast. Block 320 represents determining whether the page receiver broadcast was received by the control center. If the page receiver broadcast was not received by the control center, the broadcast transmitter waits for a random period of time, up to several tens of seconds, as illustrated in block 330 before rebroadcasting the page request according to block 310.

Block 340 represents transmitting the acknowledgement to a node upon receipt of the page broadcast. Block 350 represents determining whether the node has received the acknowledgement. If the node does not receive the acknowledgement, the acknowledgement is retransmitted. Otherwise, the node determines what subsequent node to forward acknowledgement to in order to arrive at the network gateway according to block 360.

Thereafter, block 370 represents forwarding the acknowledgement to the next node. Block 380 represents determining whether the acknowledgement has been routed to the gateway. If the acknowledgement has not been routed to the gateway, the system repeats steps 360 and 370 until the acknowledgement has worked its way from the initial node to the network gateway.

Block 390 represents routing the acknowledgement received at the gateway to the control center. The mesh network provides backhaul to the gateway node and public switch telephone network. Accordingly, the broadcast paging channel reduces or eliminates broadcast paging traffic overhead in the mesh network. Consequently all page alert traffic to the subscriber transceiver is through the wide area paging network.

It should be understood that other applications, other than paging, may be accommodated. Alarm security monitoring, credit card authorization, environmental monitoring, supervisory control and data acquisition, and messaging are also applicable uses for the invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A wide area paging system, comprising:
   (a) a paging broadcast system for transmitting paging broadcast signals over a first channel to pagers throughout a prescribed geographic area, the paging broadcast system including one or more transmitters for broadcasting the paging broadcast signals throughout the prescribed geographic area, the system including a paging control center for initiating the paging broadcast signals in response to received paging requests;
   (b) a paging response system for receiving paging response signals over a second channel from the pagers throughout the prescribed geographic area, the paging response system including a mesh network comprised of a plurality of interconnected base stations for communicating the paging response signals therebetween over a third channel, wherein one or more of the base stations includes a paging receiver;
   (c) the pagers receiving the paging broadcast signals and transmitting the paging response signals to the paging receiver; of one of the base stations in the mesh network in response thereto, the base station receiving the paging response signals including a signal conversion device for transforming the paging response signal received from the pager into a signal that is properly formatted for transmission between the base stations, the base station receiving the paging response signal thereafter automatically selecting a neighboring base station to use for forwarding the paging response signals through the mesh network, the base stations thereby transmitting the paging response signals through the mesh network to a gateway connecting the mesh network to the paging broadcast system, the gateway thereafter transmitting the paging response signals to the paging control center as an acknowledgement to the paging broadcast signals.

2. The wide area paging system of claim 1, wherein the gateway links the mesh network to the paging control center.

3. The wide area paging system of claim 2, wherein the gateway transmits the paging response signals from the mesh network to the paging control center over a telephone network.

4. The wide area paging system of claim 1, wherein the paging broadcast system further comprises means for managing the mesh network by transmitting control signals thereto.

5. The wide area paging system of claim 4, wherein the control messages are selected from a group comprising message acknowledgements, base station control messages, paging receiver control messages, DC power consumption control messages, and RF power output control messages.

6. The wide area paging system of claim 1, wherein the paging broadcast system further comprises means for managing operations of the pagers by transmitting control signals thereto.

7. The wide area paging system of claim 6, wherein the control messages are selected from a group comprising paging response acknowledgements, pager control messages, DC power consumption control messages, and RF power output control messages.

8. The wide area paging system of claim 1, wherein the paging response system is further comprised of portable nodes for receiving the paging broadcast signals and for transmitting information to the base stations in response thereto.

9. The wide area paging system of claim 1, wherein the base station receiving the paging response signal forwards the paging response signals to a hub in the mesh network, the hub coordinating the paging response signals received from the base stations and routing the paging response signals to the gateway.

* * * * *